F. BARTZ.
COFFEE MILL.
APPLICATION FILED APR. 7, 1905.

953,250.

Patented Mar. 29, 1910.

WITNESSES:
R. J. Beall
W. B. Duvall

Frank Bartz, INVENTOR,
by John B. Thomas & Co.
ATTORNEYS.

UNITED STATES PATENT OFFICE.

FRANK BARTZ, OF HORNELLSVILLE, NEW YORK, ASSIGNOR, BY MESNE ASSIGNMENTS, TO THE A. J. DEER COMPANY, INCORPORATED, OF HORNELL, NEW YORK.

COFFEE-MILL.

953,250.  Specification of Letters Patent.  Patented Mar. 29, 1910.

Application filed April 7, 1905. Serial No. 254,361.

*To all whom it may concern:*

Be it known that I, FRANK BARTZ, a citizen of the United States, residing at Hornellsville, in the county of Steuben and State of New York, have invented a Coffee-Mill, of which the following is a specification.

This invention is an improvement in coffee mills, and relates more especially to the particular dress of the grinding disks.

The principal object of the invention is to provide a pair of grinding disks for a coffee mill which shall be effective in operating, whereby to grind the beans without under friction or heating thereof.

Other objects and advantages of the invention will hereinafter appear, and what I claim as novel in the peculiar dress of the grinding disks is more specifically set forth in the appended claims.

Figure 1:
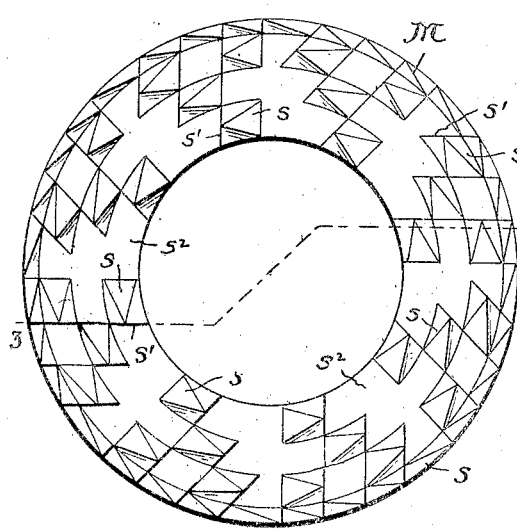
Figure 2:
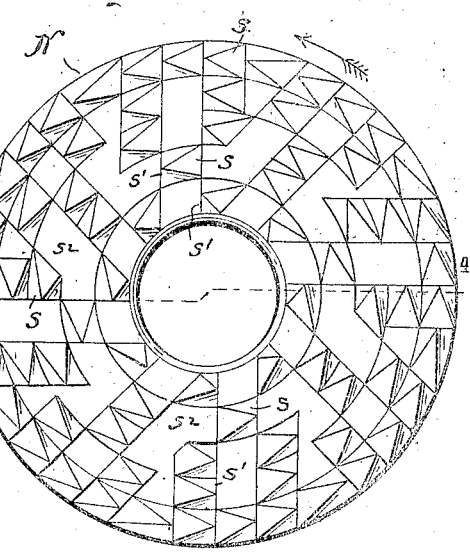
Figure 3:
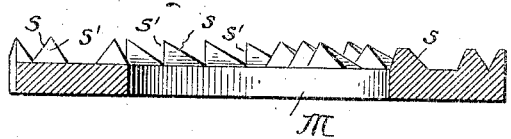
Figure 4:
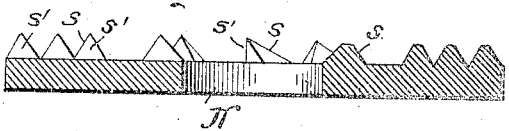
Figure 5:
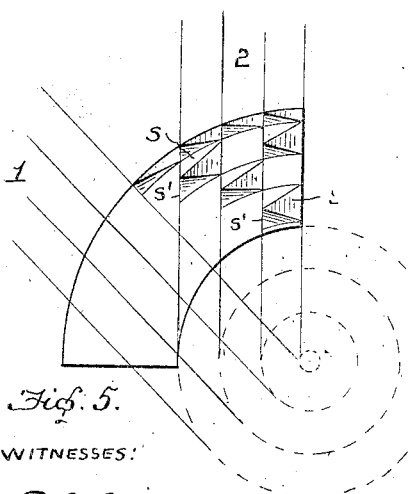
Figure 6:
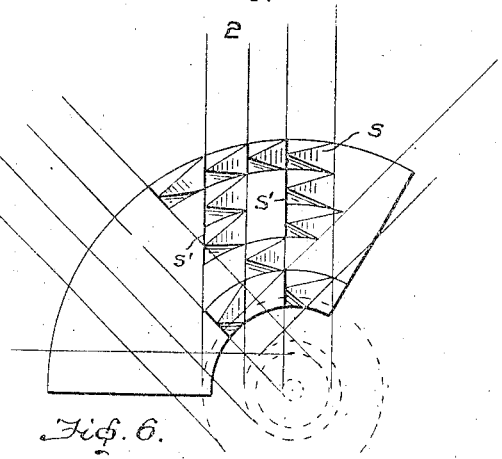

In the accompanying drawing:—Figure 1 is a plan view of one of the grinding disks, the stationary disk. Fig. 2 is a similar view of the companion disk, the rotary disk. Fig. 3 is a sectional view on the line 3—3 of Fig. 1. Fig. 4 is a sectional view on the line 4—4 of Fig. 2. Fig. 5 is a diagram view, illustrating the arrangement of teeth on the disk shown in Fig. 1; and Fig. 6 is a diagram view, illustrating the arrangement of teeth on the grinding disk shown in Fig. 2.

Referring to the drawings, M designates one of the grinding disks of a coffee mill, in the present instance the stationary grinding disk, and N designates the companion grinding disk, or the rotary disk.

The faces of the disks, between which the coffee-beans are ground, are provided with inclined teeth $s$, V-shaped at one end to form contiguous cutting edges oppositely inclined from the face of the disk, whereby said teeth in operation act rather to cut the beans than mash or grind them as is usual, and these teeth are arranged on the respective disks in such manner as to produce a shearing-cut and also to cut the beans into pieces smaller and smaller as they pass to the outer edges of the disks. For this purpose said teeth are arranged in concentric rows and the faces between the cutting edges are disposed on tangential lines extending from small circles near the central portion of the disks, the tangential lines with respect to one disk extending in an opposite direction to those of the other disk when said disks are brought together. This opposite arrangement of the cutting faces produces a shearing cut as the teeth of the opposite disks pass each other. The teeth of each row, with the exception of the outer row at the margin of the disks, are spaced apart, as shown, to form staggered recesses so that the coffee-beans and broken pieces thereof will pass into said recesses and be acted upon by the teeth as the disk N revolves.

By reference to the diagram views of the drawings it will be seen that the concentric rows of teeth are arranged in groups occupying segments of the disk, and that the faces or cutting ends of the teeth are disposed on a plurality of lines extending parallel to each other and tangentially from circles at the center of the disk, and that the outer ends $s'$ of the teeth are at right angles to the face of the disk, see Figs. 3 and 4. It will also be seen that when the grinding disks are placed face to face, or in operative position, the tangential lines of one group, as 1, Fig. 5, will cross the tangential lines of a group, as 2, Fig. 5, at an angle, so that the teeth will cut with a shearing cut.

It will be understood that in operation the teeth on one of the grinding disks oppose those on the other; that is to say, the points of the V-shaped teeth on one disk project in the opposite direction to those on the other disk, also that as the teeth incline outward toward the point they present diverging edges which act to cut the bean, and therefore there is not the friction and consequent heating of the particles usual in ordinary coffee-mills.

Having thus described my invention, what I claim as new, and desire to secure by Letters-Patent, is:—

1. In a coffee mill, a pair of grinding disks the cutting faces of which are provided with concentric rows of inclined teeth each tooth having a V-shaped end at right angles to the disk forming contiguous cutting edges oppositely inclined from the face of the disk and the V-shaped ends of the teeth of each disk disposed on tangential lines extending from concentric circles at the center portion of the disk to the outer edge of said disk, the tangential lines of one disk extending in an opposite direction to the tangential lines of the other disk, the teeth on the disks being spaced apart to provide staggered recesses, as herein shown and described.

2. A grinding disk for coffee mills having concentric rows of teeth V-shaped at their outer ends and arranged in groups occupying segments of the disk, the cutting ends of the teeth of each group being arranged on a plurality of parallel lines extending tangentially from a corresponding plurality of circles near the center of the disk.

3. A grinding disk for coffee mills having concentric rows of teeth V-shaped at their outer ends and arranged in groups occupying segments of the disk, the cutting ends of the teeth of each group being arranged on a plurality of parallel lines extending tangentially from a corresponding number of circles near the center of the disk, some of the teeth being removed to provide recesses between teeth.

In testimony whereof I have signed my name to this specification in the presence of two subscribing witnesses.

FRANK BARTZ.

Witnesses:
HOWARD L. GERBER,
BARTLEY H. LAW.